United States Patent
Onodera et al.

(10) Patent No.: US 6,349,616 B1
(45) Date of Patent: Feb. 26, 2002

(54) STEERING SYSTEM

(75) Inventors: Mikio Onodera; Katsuya Mitsuzuka, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/435,153

(22) Filed: Nov. 8, 1999

(30) Foreign Application Priority Data

Nov. 12, 1998 (JP) .......................................... 10-322356

(51) Int. Cl.[7] .............................. H01H 9/00; G05G 1/10
(52) U.S. Cl. ......................... 74/552; 200/61.54; 341/22
(58) Field of Search ............................ 74/552; 341/22, 341/23; 200/54, 533, 61.54, 61.55

(56) References Cited

U.S. PATENT DOCUMENTS

| | | | | |
|---|---|---|---|---|
| 4,374,310 A | * | 2/1983 | Kato et al. ................ | 200/61.54 |
| 4,578,592 A | * | 3/1986 | Nakazawa et al. ......... | 307/10 R |
| 4,590,340 A | * | 5/1986 | Koike et al. .............. | 200/61.54 |
| 4,771,147 A | * | 9/1988 | Buma ....................... | 200/61.54 |
| 4,797,538 A | | 1/1989 | Schick | |
| 5,949,149 A | * | 9/1999 | Shitanaka et al. .......... | 307/10.1 |
| 5,951,311 A | * | 9/1999 | Kato et al. ................. | 439/164 |
| 6,163,282 A | * | 12/2000 | Mitsuzuka et al. .......... | 341/22 |
| 6,215,201 B1 | * | 4/2001 | Numata et al. ............ | 307/10.1 |
| 6,268,576 B1 | * | 7/2001 | Onodera ................... | 200/61.54 |

FOREIGN PATENT DOCUMENTS

| | | | | |
|---|---|---|---|---|
| JP | 2-171381 | * | 7/1990 | ................. 74/552 |
| JP | 62-157860 | * | 7/1990 | ................. 74/552 |
| JP | 6-270816 | | 9/1994 | |

* cited by examiner

*Primary Examiner*—Vinh T. Luong
(74) *Attorney, Agent, or Firm*—Brinks Hofer Gilson & Lione

(57) ABSTRACT

A steering system mounted wherein a plurality of switch knobs are vertically movably inserted in a housing provided within a steering wheel, and a self-function detecting switch actuated by the pushing operation of each of the switch knobs is mounted on a printed circuit board located on the underside of said housing. The self-function detecting switch is comprised of four push switches having one driving pin. A driving portion is formed on the underside of each of the switch knobs to simultaneously press one or a plurality of driving pins. The shape of the driving portion varies with the switch knob to be used. The switch knob is restricted, by the holding cover openably provided on the steering wheel, so as not to fall out of the housing. When the operator presses any arbitrary switch knob projecting out of the holding cover, a specific identifying signal is outputted from the self-function detecting switch in accordance with the shape of the projection of the driving portion provided on the switch knob.

13 Claims, 4 Drawing Sheets

FIG. 4
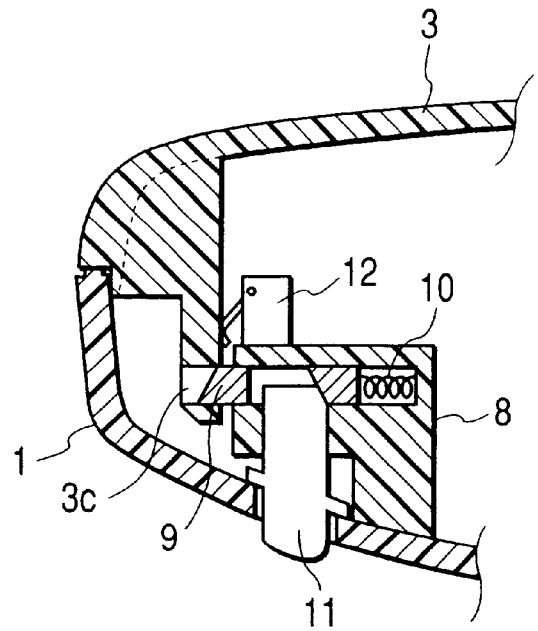
FIG. 5
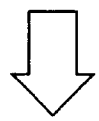
| | SW-1 | SW-2 | SW-3 | SW-4 |
|---|---|---|---|---|
| OFF | 0 | 0 | 0 | 0 |
| ON | 1 | 1 | 1 | 1 |
| | | | |
|---|---|---|---|
| 0000 | 1000 | 0100 | 0010 |
| 0001 | 1100 | 1010 | 1001 |
| 0110 | 0101 | 0011 | 1110 |
| 1101 | 1011 | 0111 | 1111 |

STEERING SYSTEM

BACKGROUND OF THE INVENTION

1. Field of the Invention

This invention relates to a steering system in which a plurality of switches carrying marks for various controls are mounted on a steering wheel.

2. Description of Related Art

There have been proposed in recent years such steering systems of motor vehicles that a plurality of switches indicating marks for various controls are mounted on a steering wheel, so that operators of the motor vehicles can readily operate the switches.

For instance, the steering system disclosed in Japanese Pat. No. Hei 6-270816 incorporates a switch unit having many kinds of switch knobs in the lower part of the steering wheel surface, and adapted to improve operation performance. The switch unit is comprised of a plurality of pushbutton switches including an automatic speed control switch, an audio switch, an air-conditioner switch having various kinds of functions; a plurality of switch knobs for on-off operation of these pushbutton switches; and a casing for holding these switches and switch knobs. The upper part of each of the switch knobs projects out of a window hole provided in the upper surface of the casing.

The switch unit thus constituted is fixedly attached in a specific position of the steering wheel. When the operator presses a switch knob to operate the steering wheel, a pushbutton switch is depressed to ON position correspondingly to the pressing of the switch knob, giving off an ON signal. According to the ON signal from the switch, specific control operation is performed correspondingly to the switch knob.

In the case of the aforesaid prior art switch system, details of control are unequivocally determined according to a switch unit incorporated in the steering wheel. It is impossible to change the array of switches having specific functions to his need and to provide the switches with different functions in place of existing functions. The prior art switches, therefore, require an improvement in ease of operation.

SUMMARY OF THE INVENTION

This invention, therefore, has an object to provide a steering system in which a plurality of switch knobs indicating various functions and a plurality of self-function detecting switches which output an identifying signal in accordance with the function of each switch knob are mounted on the steering wheel. According to this constitution, various kinds of identifying signals are outputted in accordance with the combination of the switch knobs and the self-function detecting switches. Therefore, switches having specific functions may be changed in arrangement to the operator's need; and also existing functions of switches may be replaced with other functions.

In the steering system of this invention, a plurality of switch knobs indicating various different kinds of functions and a plurality of self-function detecting switches which output an identifying signal according to the function of each switch knob are mounted on the steering wheel.

Since varied identifying signals are outputted by the combination of the switch knob and the self-function detecting switch according to this configuration, switches having specific functions maybe changed to the operator's need, and the existing functions of switches may be replaced with other functions, thereby improving convenience of operation.

The self-function detecting switch may be any type of detecting switch so long as it outputs various kinds of identifying signals in combination with a switch knob corresponding thereto. It is, however, desirable that the self-function detecting switch be provided with a plurality of driving pins which are capable of mutually independently changing over contact points, and also that the switch knob be provided with a driving section which is capable of simultaneously pressing one driving pin or a plurality of driving pins provided on the self-function detecting switch corresponding thereto, so that different identifying signal from each self-function detecting switch can be outputted in accordance with the shape of the driving sections.

According to the above-described constitution, the switching function can be altered simply by replacing the switch knob, thereby enabling to reduce the manufacturing cost of the self-function detecting switch and also allowing the operator to easily change the switching function. At this time, there may be adopted one set of self-function detecting switches including a plurality of single pin-type push switches having one driving pin; besides, multiple push switches having a plurality of driving pins projecting out from a common cabinet may be used as one set of self-function detecting switches.

When the steering wheel is fitted with an openable holding cover, which is locked in a closed state to prevent the switch knob from falling, it is possible to prevent the switch knob from flying out and hitting against the operator in the event of a collision of the motor vehicle. Also, the switch knob can easily be replaced by unlocking and opening the holding cover.

Furthermore, when the detecting switch for detecting the opening-closing operation of the holding cover and a warning means which is operated by an output signal generated by the detecting switch are provided, the operator will be warned by the warning means such as a buzzer and a lamp, of the state that the holing cover is left unclosed.

Other objects, features and advantages of this invention will be apparent from the following detailed description taken in connection with the accompanying drawings.

BRIEF DESCRIPTION OF THE DRAWINGS

FIG. 4 is a sectional view showing a lock mechanism of a holding cover;

FIG. 5 is an explanatory view showing an identifying signal of a self-function detecting switch;

DESCRIPTION OF THE PREFERRED EMBODIMENTS

Figure 1:
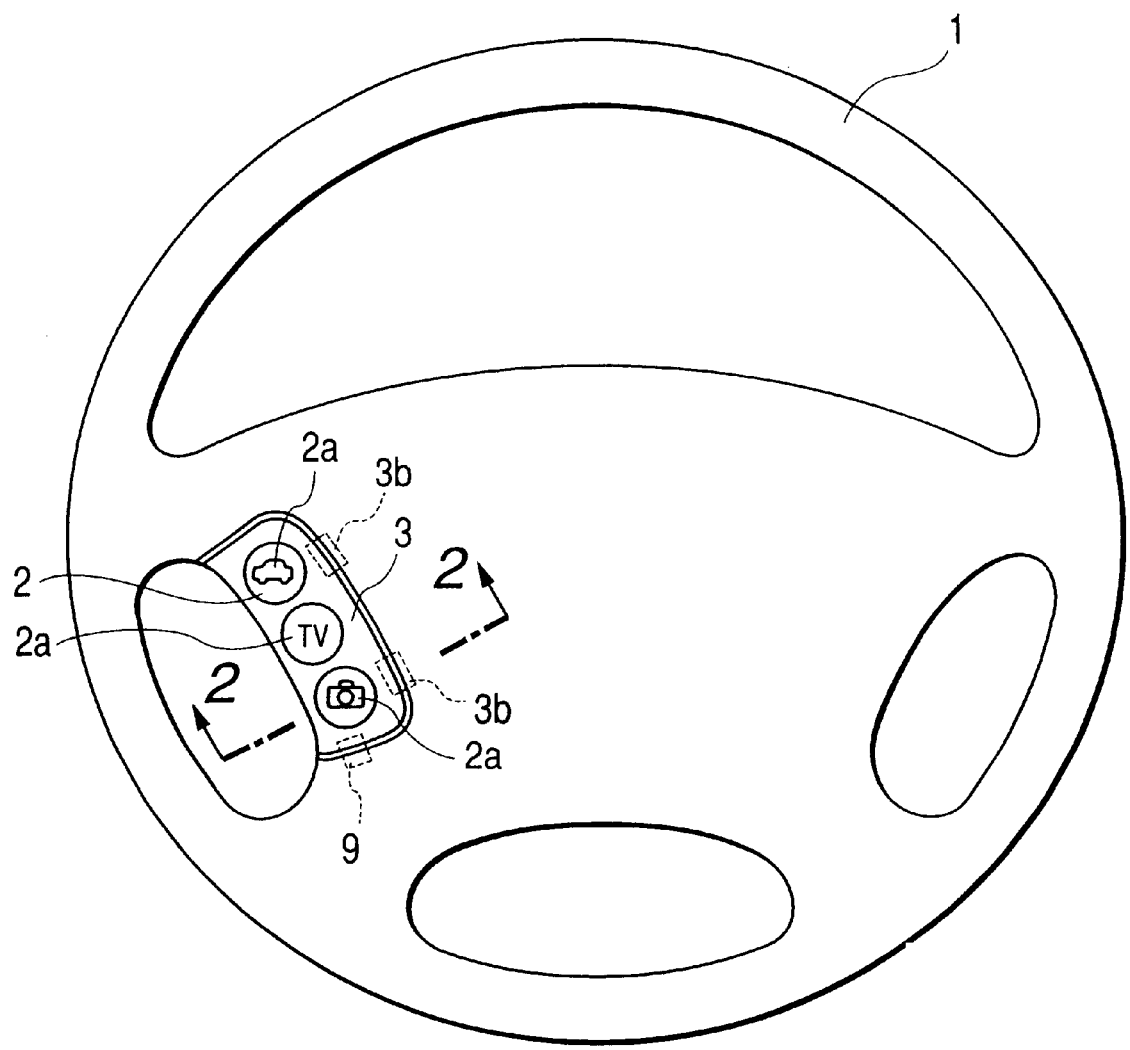
FIG. 1 is a plan view of a steering wheel.

With reference to the accompanying drawings, the embodiments will be explained. As shown in FIG. 1, a plurality (three in the present embodiment) of switch knobs 2 are arranged in specific positions of a steering wheel 1, in which the upper part of the switch knob 2 projects out of the holding cover 3. Each switch knob 2 carries a mark for each control for audio system, air-conditioner, etc. A marking portion 2a showing the mark for the control is on the top of each of the switch knobs 2. For instance, three switch knobs 2 shown in FIG. 1 carry the marking portion 2a showing a function for cutoff/circulation of outside air, a marking portion 2a showing a switching function for turning on/off the TV power source, and a marking portion 2a showing a switching function for turning on/off a rear monitor camera. Also provided are eight other switch knobs 2 which are replaceable with the three switch knobs 2 mounted on the steering wheel 1 as described later on. These switch knobs 2 also carry the marking portions 2a indicating other marks for controls.

Figure 2:
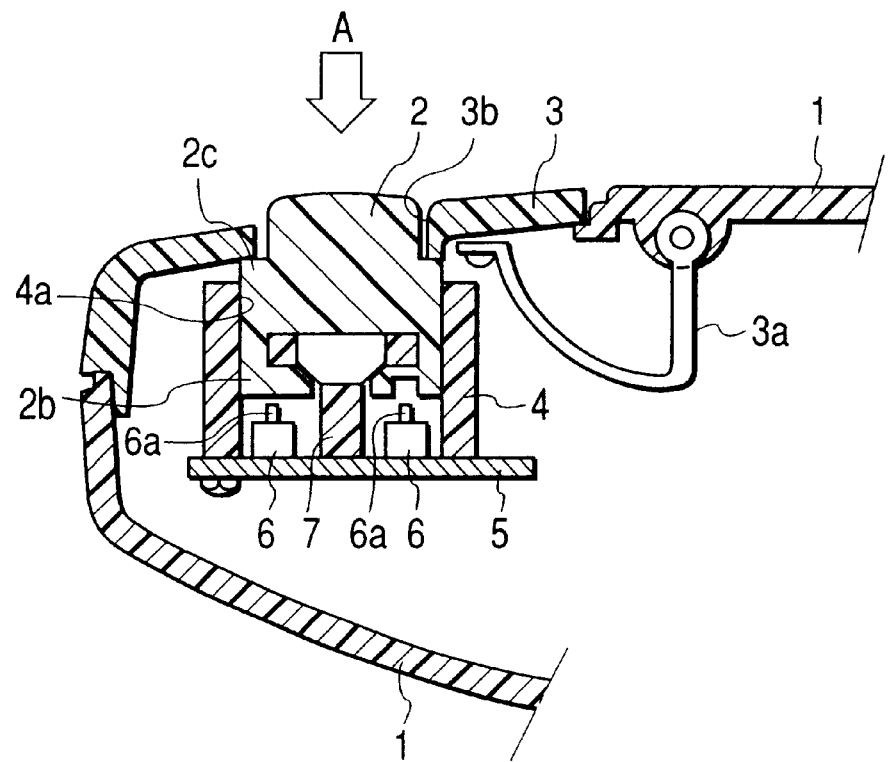
FIG. 2 is a sectional view taken along line 2—2 of FIG. 1.
Figure 3:
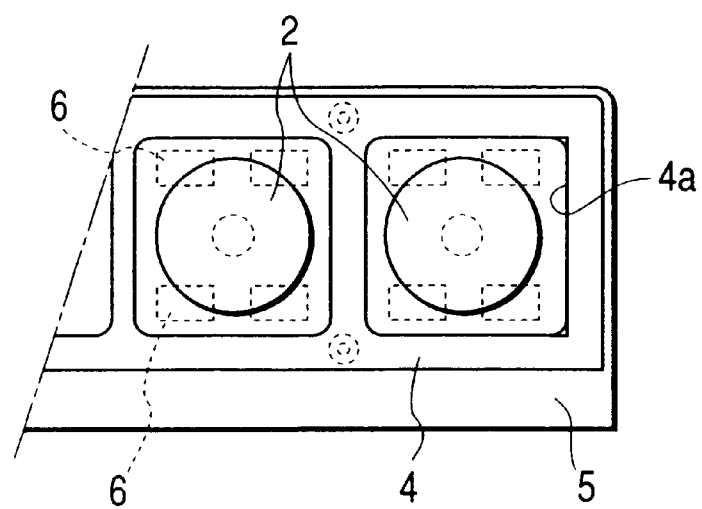
FIG. 3 is a plan view taken along the direction of the arrow A of FIG. 2.

As shown in FIGS. 2 and 3, the steering wheel 1 has a housing 4 inside, and a printed circuit board 5 is fixedly attached on the lower surface of the housing 4. On the printed circuit board 5 three sets of self-function detecting switches are mounted, each set having four push switches 6. Each push switch 6 has one driving pin 6a for changing over the contact point. The housing 4 has three guide holes 4a corresponding to three sets of push switches 6; in the guide holes 4a the switch knobs 2 are vertically movably inserted. A click rubber 7 is retained in each switch knob 2, which is pressed upwardly by the elasticity of the click rubber 7. The holding cover 3 is rotatably supported at one end to the steering wheel 1 through a hinge portion 3a. Since the upper step portion 2c of the switch knob 2 is in contact, in the window hole 3b, with the underside of the holding cover 3, the switch knob 2 is restricted so as not to accidentally come out of the guide hole 4a.

As shown in FIG. 4, a lock housing 8 is attached inside of the steering wheel 1; in the lock housing 8 a lock slider 9 is horizontally movably retained. The lock slider 9 faces, at its one end, a locking hole 3c provided in the holding cover 3, and a spring 10 is interposed between the other end of the lock slider 9 and the lock housing 8. The lock slider 9 is actuated by an unlock button 11, the lower part of which is protruding out of the back side of the steering wheel 1. FIG. 4 shows the lock slider 9 with its one end fitted and locked in the locking hole 3c of the holding cover 3. When the unlock button 11 is pushed upwardly from the locked state, the tapered top end of the unlock button 11 slides the lock slider 9 to the right in the drawing against a spring 10. Therefore, one end of the lock slider 9 comes off out from the locking hole 3c, thus unlocking the holding cover 3, which therefore can be turned (opened) on the hinge portion 3a. On the lock housing 8, a limit switch 12 is attached to detect the opening-closing operation of the holding cover 3, to thereby operate an unillustrated warning means by an output signal generated by the limit switch 12. The warning means is comprised of a buzzer and a lamp disposed in specific positions on the steering wheel 1, the instrument panel, or other. In case the motor vehicle is started with the holding cover 3 left unclosed, the buzzer and the lamp will be operated to give a warning to the operator.

Referring to FIG. 2, formed on the underside of each switch knob 2 is a driving portion 2b which can simultaneously push to operate one or a plurality of driving pins 6a which make up one set of self-function detecting switches. Each driving portion 2b has a shape different from others by each switch knob 2 so that it can push to operate proper one of the driving pins 6a. That is, in the present embodiment, three of eleven switch knobs 2 are mounted on the steering wheel 1. Let four push switches 6 of one set of self-function detecting switches be SW-1, SW-2, SW-3, and SW-4, and the shape of the driving portion 2b varies by each of the eleven switch knobs 2. For example, one of the switch knobs 2 has a projection capable of pushing only SW-1, but other switch knobs 2 have projections which can push SW-2 and SW-3 simultaneously.

Providing the switch knobs 2 with the driving portions 2b having different-shaped projections can output 16 kinds of switch signals from the four push switches SW-1, SW-2, SW-3, and SW-4. When the switch knob 2 for example is provided with the driving portion 2b which can push only SW-1, a typical switch signal "1000" is outputted in accordance with the pushing operation of the switch knob 2. And when the switch knob 2 is provided with the driving portion 2b capable of simultaneously pressing SW-2 and SW-3, other switch signal "0110" is outputted in accordance with the pushing operation of the switch knob 2. However, the switch signal "0000" is equivalent to the state that the four switches SW-1, SW-2, SW-3 and SW-4 are all in off position. Fifteen kinds of switch signals except the switch signal "0000" are usable as identifying signals of the self-function detecting switch. In the present embodiment, 11 switch knobs 2 are used, and therefore it is sufficient to use 11 kinds of identifying signals from the 15 kinds of switch signals.

Figure 6:
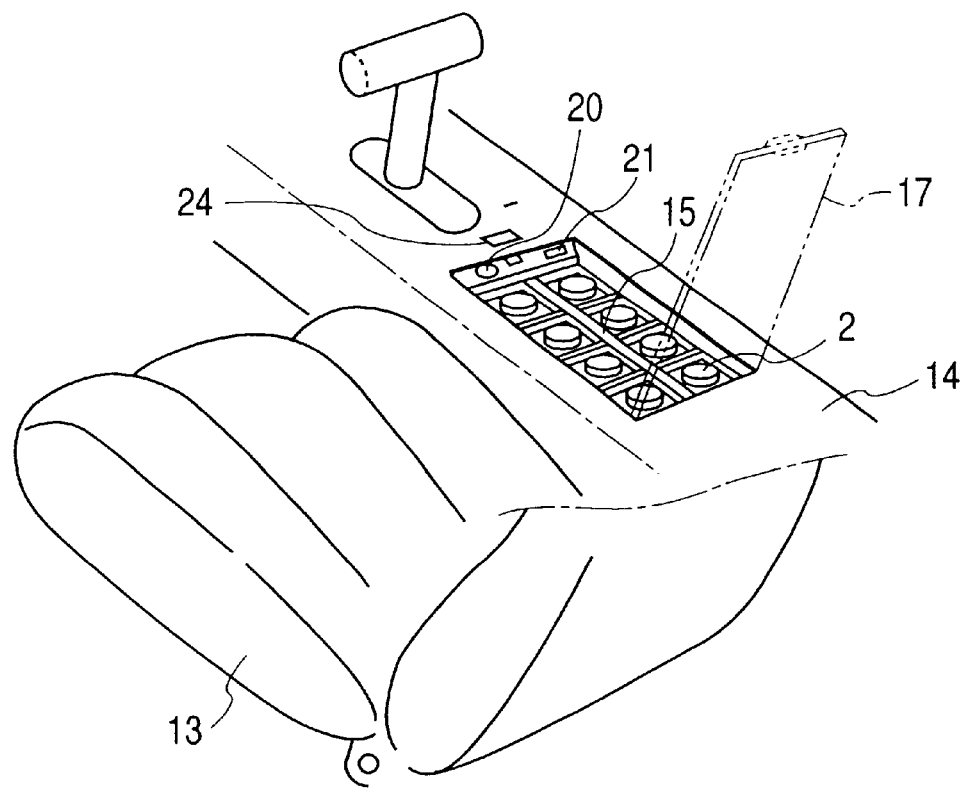
FIG. 6 is a perspective view of a switch knob housing device.
Figure 7:
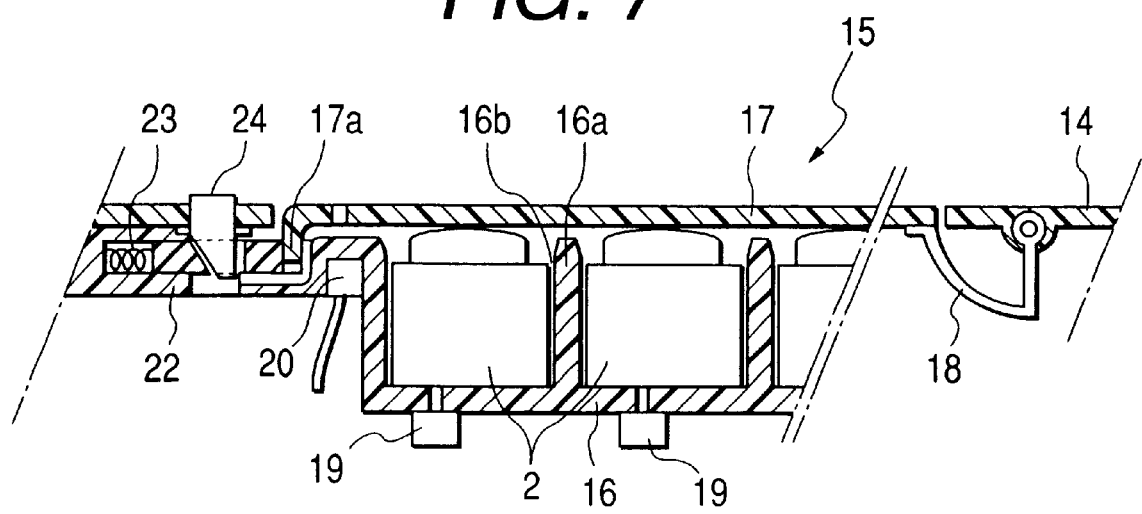
FIG. 7 is a sectional view of a major portion of the switch knob housing device.

As shown in FIGS. 6 and 7, a seat 13 and a center console 14 are set inside of the motor vehicle; on the center console 14 a switch knob housing device 15 is provided. The switch knob housing device 15 is fitted with a frame 16 which is attached within a recess of the center console 14, and a cover 17 which is opened and closed at the top of the frame 16. The cover 17 is rotatably support at one end to the center console 14 through a hinge portion 18. The frame 16 is divided into a plurality of rooms 16b by a partition wall 16a. Of the 11 switch knobs 2 to be used in the present embodiment, eight switch knobs 2 are adapted to be housed in each room 16b of the frame 16, and other three switch knobs 2 are to be mounted on the steering wheel 1. At the inside bottom portion of each room 16b of the frame 16, a detecting switch 19 is mounted. The detecting switch 19 is operated by means of the switch knob 2 inserted in the room 16b. On the upper surface of the frame 16 are mounted a buzzer 20 and an LED 21 which are actuated in accordance with a detection signal from each detecting switch 19. When the detecting switches 19 are not housed in all the rooms 16b, the operator is warned by sounding the buzzer 20 and lighting up the LED 21. Either one of the buzzer 20 and the LED 21 may be dispensed with, to give a warning to the operator by the buzzer 20 or the LED 21.

The switch knob housing device 15 also is provided with an unlocking mechanism similar to that used in the holding cover 3 side previously stated. That is, a lock slider 22 is horizontally movably held within the center console 14. The lock slider 22 is pressed by the force of a spring 23 towards fitting in a locking hole 17a provided in the cover 17. The lock slider 22 is actuated by an unlock button 24, the upper part of which is projecting out of the upper surface of the center console 14. FIG. 7 shows the locked state that one end of the lock slider 22 fits in the locking hole 17a of the cover 17. When the unlock button 24 is pushed downwardly from this locked state, the tapered lower end of the unlock button 24 forces the lock slider 9 to slide to the left in the drawing against the spring 22. Thus one end of the lock slider 22 goes out of the locking hole 17a into the unlocked state, allowing the cover 17 to turn (open) on the hinge portion 18 as a support point.

Next, operation of the above-described embodiment will be explained. When the three switch knobs 2 mounted on the steering wheel 1 are in array positions shown in FIG. 1 and the operator depresses the top face of any switch knob 2, the switch knob 2 moves downwardly within the guide hole 4a of the housing 4 against the elasticity of the click rubber 7, the driving portion 2b provided on the bottom face of the switch knob 2 pushes one or a plurality of the driving pins 6a of the four push switches 6 (SW-1, SW-2, SW-3 and SW-4) constituting the self-function detecting switch. For instance, when the driving portion 2b of the switch knob 2 located at center in FIG. 1 has a shape of projection correspondingly to SW-2, the driving pin 6a of one push switch 6 (SW-2) is pressed by the switch knob 2 thus depressed, and accordingly a switch signal "0100" corresponding to the push switch 6 (SW-2) is outputted from the self-function detecting switch. Therefore, when this switch signal is outputted as a specific identifying signal to an unillustrated CPU, the CPU detects the ON operation of the push switch 6 (SW-2) in accordance with the identifying signal "0010" and, at the same time, judges the control function of the push switch 6 (SW-2), outputting a control signal for turning on and off the TV power source. Similarly, when the switch knob 2 located in the upper part or lower part in FIG. 1 is depressed, the driving portion 2b of the switch knob 2 pushes one or a plurality of driving pins 6a. Therefore other identifying signal than the identifying signal stated above is outputted from the self-function detecting switch, thereby performing specific control operations, namely the outside air cutoff/circulation changeover operation and the on/off changeover operation of the rear monitor camera, correspondingly to the switch knobs 2 that have been pressed in accordance with these identifying signals.

The three switch knobs 2 mounted on the steering wheel 1 may be altered in array positions in accordance with the driver Is (user's) need. In this case, first the unlock button 11 projecting out of the back surface of the steering wheel 1 is pushed in upwardly to thereby unlock the lock slider 9 from the locking hole 3c. Then, the holding cover 3 is turned to open on the hinge portion 3a as a support point. In this state, the switch knobs 2 located for instance at center and in the lower part in FIG. 1 are both pulled out from the guide hole 4a of the housing 4, to change positions of the switch knobs 2. Then after inserting the switch knobs 2 into the guide hole 4a, the holding cover 3 may be closed and locked again. However, if the array positions of the switch knobs 2 at center and in the lower part of FIG. 1 are changed, an identifying signal is outputted by depressing any specific switch knob 2. Since the identifying signal is determined by the driving portion 2b of the switch knob 2, a function to switch the rear monitor camera may be imparted to the switch knob 2 located at center, and a function to switch the TV power source also may be imparted to the switch knob 2 located in the lower part.

Furthermore, it is possible to replace the three switch knobs 2 present on the steering wheel 1 with other switch knobs 2 housed in the switch knob housing device 15, to thereby give a different switching function to the steering wheel 1 side. In this case, the holding cover 3 and the cover 17 are unlocked to open; the switch knob 2 mounted on the steering wheel 1 is replaced with other switch knob 2 which is housed in the switch knob housing device 15; and then the holding cover 3 and the cover 17 are closed and locked again.

In the embodiment stated above, the self-function detecting switch comprising four push switches 6 is mounted on the steering wheel 1 side and the driving portion 2b having a projection of different shape is formed on each switch knob 2 removably mounted on the steering wheel 1, thereby outputting a specific identifying signal, from a common self-function detecting switch, according to the shape of projection of the driving portion 2b. Therefore, it is possible to alter the array of the switches having specific functions according to the operator's need and also to giving the steering wheel 1 a different switching function in place of the existing switching function, thereby largely improving operation controllability. Furthermore, the switching function can readily be changed simply by replacing the switch knobs 2; and the push switch 6 for general use is usable as the self-function detecting switch, enabling cost reduction. Since the holding cover 3 mounted to prevent accidental removal of the switch knob 2 from the steering wheel 1 is adapted to be locked in a closed state, it is possible to prevent the switch knob 2 from jumping out and hitting against the operator in case of a collision or any other accident of the motor vehicle. The switch knob 2 can readily be replaced with the holding cover 3 unlocked and opened. Furthermore, there is provided a limit switch 12 for detecting the opening-closing operation of the holding cover 3, to operate the warning means such as a buzzer and a lamp by means of an output signal from the limit switch 12. It is, therefore, possible to give the operator the warning that the holding cover 3 is left unclosed.

It should be noticed that the quantity of the switch knobs 2 to be used and the function of each of the switch knobs 2 are not limited to the above-described embodiments. To give an example of other functions of the switch knob used in combination, the functions of the three switch knobs shown in FIG. 1 may be PLAY, STOP and SELECT of the audio system. According to these functions, the operator can select his desired kind of an audio program by the SELECT switch knob, listen to the thus selected audio program by the PLAY switch knob, and stop by the STOP switch knob. In the case of these knobs, the functions of the switch knobs pertaining to the audio system are gathered to one place to allow easy handling. The functions of the three switch knobs in FIG. 1 may be changed to REC/FRESH, REAR DEF, and FRONT DEF pertaining to the air-conditioner. In this case, the REC/FRESH switch knob is operated to change over between introduction of fresh outside air and air circulation in the room; the REAR DEF switch knob is used to perform defrosting the rear window; and the FRONT DEF switch knob is operated for defrosting the windshield. In this case also, the switch knobs are readily usable because of provision of related functions about the air-conditioner. Furthermore, the functions of the three switch knobs in FIG. 1 maybe changed to such functions of a heater as STEERING HEATER ON/OFF, MIRROR HEATER ON/OFF, and SEAT HEATER ON/OFF. In this case, the switch knobs pertaining to the heaters may be used only during the cold season and removed from the steering wheel during the warm season, and may be replaced with switch knobs having other functions.

In the embodiment described above, one self-function detecting switch comprising of four push switch 6 has been explained, which may be replaced with a quadruple push switch with four driving pins projecting out of a common cabinet.

Furthermore, in the above-described embodiment, one set of self-function detecting switches having four driving pins has been explained, the quantity of which, however, may be increased or decreased as occasion calls. In this case, the provision of the one set of self-function detecting switches with n-number ("n" indicates two or more) of driving pins can output ($2^n-1$) different kinds of identifying signals in accordance with the combination of these driving pins with the driving portion of each switch knob 2.

This invention heretofore explained in its embodiment has the following advantages.

In the case of a steering wheel mounted with a plurality of switch knobs indicating different functions and a plurality of self-function defecting switches which output an identifying signal in accordance with the function of each switch knob, various kinds of identifying signals are outputted according to a combination of the switch knob with the self-function detecting switch. Therefore, it is possible to change the array of switches having specific functions according to the operator's need, and also to impart to the switches other functions in place of existing functions, thereby remarkably improving ease of operation control.

What is claimed is:

1. A steering system in which a plurality of switch knobs are mounted on a steering wheel, each switch knob indicating a different type of function, said switch knobs being removably arranged in a plurality of arrangement positions on said steering wheel, and a plurality of self-function detecting switches for outputting identifying signals in accordance with the type of function of each switch knob, wherein each of said switch knobs comprises a driving portion of a different shape in accordance with the type of function of said switch knob, and wherein said self-function detecting switches output a different identifying signal in accordance with the type of function of each of said switch knobs in response to the shape of the driving portion of each of said switch knobs.

2. A steering system as claimed in claim 1, wherein each said self-function detecting switch has a plurality of driving pins each capable of independently changing over a contact point, and the shape of the driving portion of each of said switch knobs is capable of pressing at least one of said driving pins provided in said self-function detecting switch.

3. A steering system as claimed in claim 2, wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position.

4. A steering system as claimed in claim 3, wherein there is provided a detecting switch for detecting the opened position and the closed position of said holding cover, and a warning means which is operated by a signal outputted from said detecting switch when said holding cover is in the opened position.

5. A steering system as claimed in claim 1, wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position.

6. A steering system as claimed in claim 5, wherein there is provided a detecting switch for detecting the opened position and the closed position of said holding cover, and a warning means which is operated by a signal outputted from said detecting switch when said holding cover is in the opened position.

7. A steering system in which a plurality of switch knobs are mounted on a steering wheel, each switch knob indicating a different type of function, said switch knobs being removably arranged in a plurality of arrangement positions on said steering wheel, and a plurality of self-function detecting switches for outputting identifying signals in accordance with the type of function of each switch knob, wherein each of said switch knobs comprises a driving portion of a different shape in accordance with the type of function of said switch knob, wherein each of said self-function detecting switches has a plurality of driving pins each capable of independently changing over a contact point, wherein the shape of the driving portion of each of said switch knobs is capable of pressing at least one of said driving pins provided in said self-function detecting switch, and wherein said self-function detecting switches output a different identifying signal in accordance with the type of function of each of said switch knobs in response to the shape of the driving portion of each of said switch knobs pressing at least one of said plurality of driving pins in said self-function detecting switch.

8. A steering system as claimed in claim 7, wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position.

9. A steering system as claimed in claim 8, wherein there is provided a detecting switch for detecting the opened position and the closed position of said holding cover, and a warning means which is operated by a signal outputted from said detecting switch when said holding cover is in the opened position.

10. A steering system in which a plurality of switch knobs are mounted on a steering wheel, each switch knob indicating a different type of function, said switch knobs being removably arranged in a plurality of arrangement positions on said steering wheel, and a plurality of self-function detecting switches for outputting identifying signals in accordance with the type of function of each switch knob, wherein each of said switch knobs comprises a driving portion of a different shape in accordance with the type of function of said switch knob, wherein said self-function detecting switches output a different identifying signal in accordance with the type of function of each of said switch knobs in response to the shape of the driving portion of each of said switch knobs, and wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position.

11. A steering system as claimed in claim 10, wherein there is provided a detecting switch for detecting the opened position and the closed position of said holding cover, and a warning means which is operated by a signal outputted from said detecting switch when said holding cover is in the opened position.

12. A steering system in which a plurality of switch knobs are mounted on a steering wheel, each switch knob indicating a different type of function, said switch knobs being removably arranged in a plurality of arrangement positions on said steering wheel, and a plurality of self-function detecting switches for outputting identifying signals in accordance with the type of function of each switch knob, wherein each of said switch knobs comprises a driving portion of a different shape in accordance with the type of function of said switch knob, wherein each of said self-function detecting switches has a plurality of driving pins each capable of independently changing over a contact point, wherein the shape of the driving portion of each of said switch knobs is capable of pressing at least one of said driving pins provided in said self-function detecting switch, wherein said self-function detecting switches output a different identifying signal in accordance with the type of function of each of said switch knobs in response to the shape of the driving portion of each of said switch knobs pressing at least one of said plurality of driving pins in said self-function detecting switch, wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position, and wherein there is provided a detecting switch for detecting the opened position and the closed position of said holding cover, and a warning means which is operated by a signal outputted from said detecting switch when said holding cover is in the opened position.

13. A steering system in which a plurality of switch knobs are mounted on a steering wheel, each switch knob indicating a different type of function, said switch knobs being removably arranged in a plurality of arrangement positions on said steering wheel, and a plurality of self-function detecting switches for outputting identifying signals in accordance with the type of function of each switch knob, wherein each of said switch knobs comprises a driving portion of a different shape in accordance with the type of function of said switch knob, wherein said self-function detecting switches output a different identifying signal in accordance with the type of function of each of said switch knobs in response to the shape of the driving portion of each of said switch knobs, wherein said steering wheel is provided with a holding cover which is movable between an opened position to permit the switch knobs to be arranged in the plurality of arrangement positions and a closed position to prevent accidental removal of said switch knobs from said steering wheel, said holding cover comprising an engagement portion that is releasebly engaged by a lock member on said steering wheel to lock said holding cover in the closed position, and wherein there is provided a detecting switch for detecting the opened position and the closed position of said holding cover, and a warning means which is operated by a signal outputted from said detecting switch when said holding cover is in the opened position.

* * * * *

UNITED STATES PATENT AND TRADEMARK OFFICE
CERTIFICATE OF CORRECTION

PATENT NO. : 6,349,616 B1
DATED : February 26, 2002
INVENTOR(S) : Mikio Onodera et al.

It is certified that error appears in the above-identified patent and that said Letters Patent is hereby corrected as shown below:

Column 7,
Line 33, delete "claim 2" and substitute -- claim 1 -- in its place.
Line 48, delete "claim 1" and substitute -- claim 2 -- in its place.

Signed and Sealed this

Twenty-ninth Day of October, 2002

Attest:

JAMES E. ROGAN
Attesting Officer          Director of the United States Patent and Trademark Office